Nov. 16, 1965   C. E. GRUENINGER   3,217,385

CUTTING TOOL

Filed Feb. 25, 1964

INVENTOR.
CARL E. GRUENINGER
BY
Andrus & Starke
ATTORNEYS

United States Patent Office 3,217,385
Patented Nov. 16, 1965

3,217,385
CUTTING TOOL
Carl E. Grueninger, Elm Grove, Wis., assignor to Waukesha Cutting Tools, Inc., Waukesha, Wis., a corporation of Wisconsin
Filed Feb. 25, 1964, Ser. No. 347,197
10 Claims. (Cl. 29—105)

This invention relates to a cutting tool, and more particularly to a rotary cutting tool having provision for accurate adjustment of a plurality of cutting members.

Tool bodies are often provided with an axial bore around which is disposed a plurality of cutting members. In accordance with the present invention, an axially fixed removable replaceable bushing is disposed within the bore. The cutting members are indexable and the inner edges thereof abut the surface of the bushing. For adjustment purposes, the cutting members may be indexed or the bushing may be replaced with another bushing having a different diameter or shape. In addition, novel means are provided for insuring complete line contact between the tool bits and clamps therefore.

The accompanying drawing illustrates the best mode presently contemplated by the inventor for carrying out the invention.

Figures 3, 4:
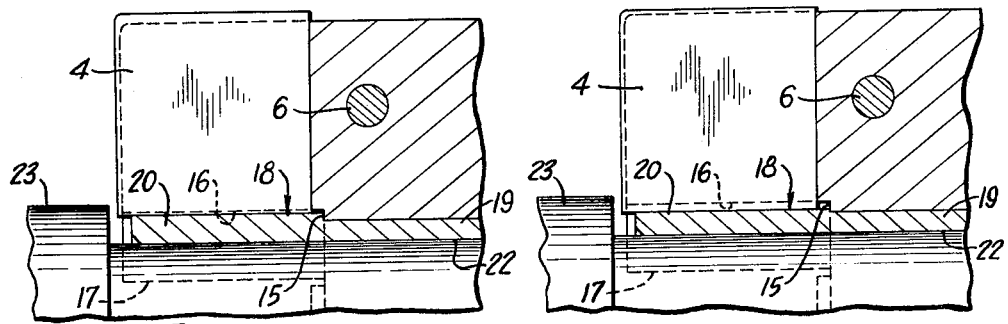
FIG. 3 is an enlarged fragmentary section of the tool of FIGURE 1.
FIG. 4 is a view similar to FIG. 3 and showing a different bushing size.

As shown in FIGURES 1-4 of the drawing, the counterbore tool comprises a tool body 1 having an inner end portion adapted to be secured to the spindle of a suitable rotary drive mechanism (not shown) and an outer cutting end portion. The cutting end portion is provided with a plurality of circumferentially spaced mounting members 2 formed with indented surfaces 3 for receiving generally rectangular radially extending tool bits 4 having pairs of parallel longitudinally and radially extending edges. Suitable clamps 5 secure bits 4 in place, as by screws 6 which extend into mounting members 2 and hold the clamps in place.

As shown clamps 5 are generally wedge-shaped at their forward ends and thus provide a straight line edge 7 adapted to engage the respective bit 4. It is highly desirable that a definite line contact be made between each edge 7 and its bit 4 to prevent cuttings and other foreign matter from getting underneath the guide. For this purpose, each member 2 is provided with a ledge 8 adapted to be disposed slightly above the adjacent bit face 9, with the bit being in contact with the surfaces 3 stepped below and extending longitudinally outwardly from the ledge. A set screw 10 extends through each mounting member 2 and tighteningly engages the inner end portion of clamp 5. The clamp thus tends to pivot about screw 6 to force edge 7 against the bit.

Although four mounted bits are shown, the tool may be constructed to utilize any suitable number of bits without departing from the spirit of the invention.

Figure 2:
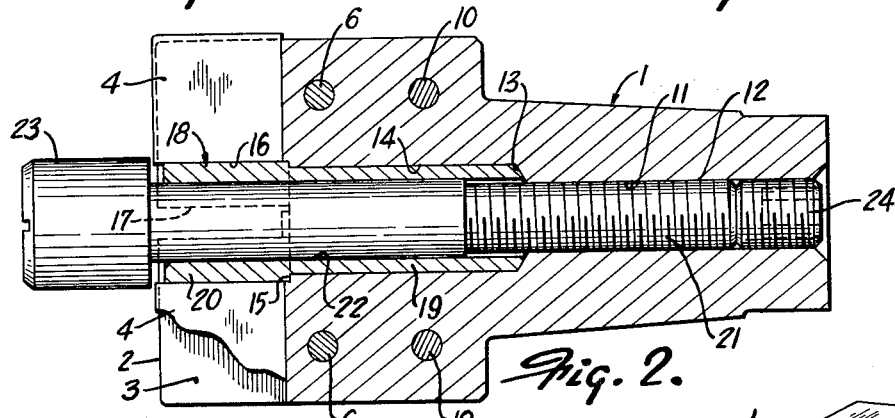
FIG. 2 is an axial section of the tool taken on line 2—2 of FIGURE 1.
Figures 1, 5:
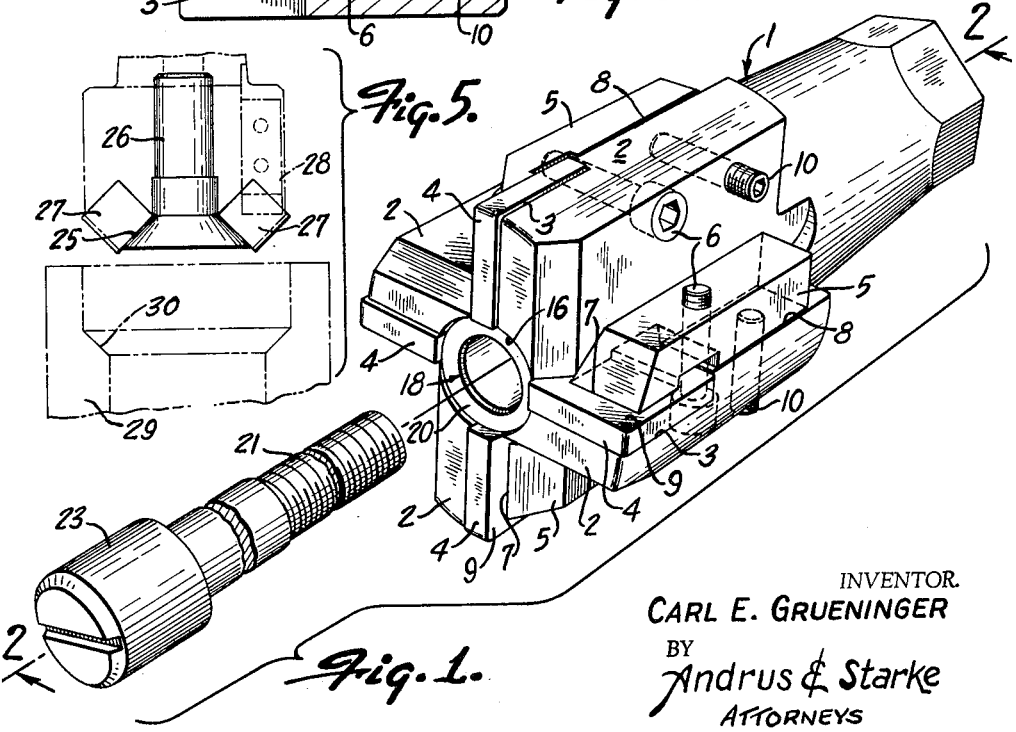
FIGURE 1 is a partially exploded perspective view of a counterbore tool constructed in accordance with the invention.
FIG. 5 is a generally diagrammatic view showing another embodiment of the invention.

As best shown in FIG. 2, tool body 1 is provided with a longitudinal axial bore of stepped construction. The inner end 11 of the bore is threaded at 12 for purposes to be described, and merges through an outwardly facing shoulder 13 into a central bore portion 14 of increased diameter. Portion 14 in turn merges through an outwardly facing shoulder 15 into an outer bore portion 16 of further increased diameter.

Bore portion 16 is provided with a plurality of circumferentially spaced longitudinally extending slots 17 which are disposed to permit the longitudinal inner edges of tool bits 4 to extend into the bore. Thus bits 4 may be adjusted radially before clamping so that they extend a predetermined desired distance into the bore, depending upon the radial extent of the bit.

To provide an inner bearing surface for the bits, an annular bushing 18 is provided in the bore. The inner end portion 19 of bushing 18 is of substantially the same diameter as central core portion 14 and is tightly press fit therein so that the inner bushing end abuts shoulder 13. The bushing is thus fixed against axial movement. The outer end portion 20 of bushing 18 is disposed outwardly of shoulder 15 and is adapted to be engaged by the flat edges of the tool bits. Portion 20 provides a fixed stop for the bits, which are in tangential contact therewith, and may be of whatever diameter is desired to give the desired radial placement for the bits.

FIG. 3 shows a bushing wherein outer bushing portion 20 is spaced very slightly from the wall of outer bore portion 16 so that the cutting edge of any given tool bit will be disposed a known distance from the tool axis. In FIG. 4, portion 20 is spaced further in from portion 16 so that a bit of the same size will have its cutting edge closer to the axis than that of FIG. 3. Different size bores may thus be cut with the same size bits, merely by changing the bushing.

Tool bits 4 are contemplated as having similar cutting edges on all four sides. Thus, when one edge becomes worn the bit may be indexed in position to present a fresh unworn edge to the surface to be cut. When all usable bit edges are worn, the bit may be thrown away and a new one inserted in the clamp.

In some instances, the diameter of bushing portion 20 may be only slightly less than that of bore portion 16, so that the two portions may be touching. In other instances, it may be desired to have the diameter of bushing portion 20 substantially less. Thus, with different size bushing portions, the radial placement of the inner longitudinal edge of bits 4 relative to the bore axis may vary from the radius of the bore to substantially less than the radius.

In all cases, the adjustment is provided by knocking one bushing out of the bore, as by a tool (not shown) inserted through the inner bore end, and replacing it with a bushing of different diameter contact surface.

For the purpose of maintaining proper alignment of the tool as it proceeds into the work, a pilot is utilized in some instances. The pilot extends into the bore and has an inner threaded portion 21 which is threaded into threads 12. The outer pilot end extends through a central opening 22 in bushing 18, and the outer enlarged head 23 of the pilot is fixedly spaced from the bit edges as by a set screw 24 at the inner pilot end.

In FIGURES 1-4 the bushing is shown as having a cylindrical outer bearing surface for receiving the radially inwardly disposed longitudinal tool bit edges. In some instances it may be desirable to provide a conical or other shape for the bushing end portion. For example, in FIG. 5 the adjustment surface 25 of a bushing 26 is conically tapered, the bushing still remaining fixed against axial movement. Tool bits 27 are clamped at an angle by clamps 28 which are similar to clamps 5. In this instance, the cutting edge to be used and its parallel mate are disposed at an angle to the axis of the tool body. The edges perpendicular to the cutting edge extend through slots similar to slots 17. This construction may be utilized for core drills or the like. In a core drill application, a finish bore may be made in a cast metal tube 29. If desired, a champfered seating surface 30 may be provided in the bore by proceeding only part way through the tube.

The angle of cutting and chamfer, as well as their size may be changed at will by changing the bushing 26 while utilizing the same bits 27.

The invention provides a novel means for tool bit adjustment in a cutting tool. The axially fixed bushing is not only replaceable with bushing having different diameter and shape bit contact surfaces, but also receives the radial thrust transmitted by the bits.

Various modes of carrying out the invention are contemplated as being within the scope of the following claims particularly pointing out and distinctly claiming the subject matter which is regarded as the invention.

I claim:

1. A cutting tool comprising:
   (a) a tool body having an inner end adapted to be rotatably driven and an outer cutting end,
   (b) a plurality of circumferentially spaced tool bit mounting members disposed at the said outer cutting end of said body,
   (c) a radially extending tool bit disposed on each said mounting member and being disposable in a plurality of radial positions,
   (d) clamp means for securing each said tool bit to each said mounting member in any of said radial positions,
   (e) said tool body having an axial bore extending therethrough, with said bore having a plurality of longitudinal slots disposed to permit extension of the inner longitudinal edges of said tool bits into said bore,
   (f) an annular bushing disposed in said bore and fixed against axial movement therein,
   (g) said bushing having an outer end portion disposed adjacent said slots and providing a bearing surface engaged by the said longitudinal edges of said tool bits, and being replaceable with bushings having outer end portions of differing desired diameter to provide for radial adjustment of said bits,
   (h) and a pilot extending through an opening in said bushing and into the inner end of said bore for guiding the tool into a workpiece.

2. The tool of claim 1 in which the said bearing surface of said bushing (g) is spaced radially inwardly from the wall of said bore (e).

3. A cutting tool comprising:
   (a) a tool body having an inner end adapted to be rotatably driven and an outer cutting end,
   (b) a plurality of circumferentially spaced tool bit mounting members disposed at the said outer cutting end of said body,
   (c) a radially extending tool bit disposed on each said mounting member and being disposable in a plurality of radial positions,
   (d) clamp means for securing each said tool bit to each said mounting member in any of said radial positions,
   (e) said tool body having an axial bore extending therethrough, with said bore having:
      (1) an inner threaded end portion,
      (2) a central portion of larger diameter than and connected to said inner end portion by an outwardly facing shoulder,
      (3) and an outer end portion of larger diameter than and connected to said central portion,
         (A) said outer end portion having a plurality of circumferentially spaced longitudinal slots disposed to permit extension of the inner longitudinal edges of said tool bits into said bore,
   (f) an annular bushing disposed in said bore and having:
      (1) an inner end portion press fit into the central portion of said bore and thereby fixed against axial movement,
      (2) and having an outer end portion disposed adjacent said slots and providing a bearing surface engaged by the said longitudinal edges of said tool bits, and being replaceable with bushings having outer end portions of differing desired diameter to provide for radial adjustment of said bits,
   (g) and a pilot extending through an opening in said bushing and threaded into said inner end portion of said bore for guiding the tool into a workpiece.

4. The tool of claim 3:
   (a) in which said pilot has an enlarged head disposed externally of the bore and which is spaced slightly from the outer radial edges of said bits,
   (b) and a set screw disposed in said inner threaded end portion of said bore and adapted to engage the inner end of said pilot to fix said head in the spaced position of (a).

5. A cutting tool comprising:
   (a) a tool body having an inner end adapted to be rotatably driven and an outer cutting end,
   (b) a plurality of circumferentially spaced tool bit mounting members disposed at the said outer cutting end of said body,
   (c) a generally rectangular radially extending tool bit on each said mounting member and being disposed so that two parallel edges of the bit extend longitudinally and the other two parallel edges thereof extend radially,
   (d) clamp means securing each said tool bit to each said mounting member in the position of (c),
   (e) said tool body having an axial longitudinal bore extending therethrough, with said bore providing a longitudinal slot in each said mounting members to permit extension of the inner longitudinal edges of the respective bit into said bore,
   (f) and an annular bushing disposed in said bore and fixed against axial movement therein,
   (g) said bushing having an outer end portion with a cylindrical bearing surface engaged by the radially inwardly disposed longitudinal edges of said bits,
   (h) and said bushing being replaceable with bushings have cylindrical bearing surfaces of differing desired diameters to provide for radial adjustment of said bits.

6. The tool of claim 5 in which: each edge of each said tool bit is a cutting edge so that the bit may be indexed in position to present different edges to the work.

7. A cutting tool comprising:
   (a) a tool body having an inner end adapted to be rotatably driven and an outer cutting end,
   (b) a plurality of circumferentially spaced tool bit mounting members disposed at the said outer cutting end of said body,
   (c) a generally rectangular radially extending tool bit on each said mounting member, with each said tool bit providing two pairs of parallel edges,
   (d) clamp means securing each said tool bit to each said mounting member so that a cutting edge thereof and its parallel mate are disposed at an angle to the axis of the said body,
   (e) said tool body having an axial longitudinal bore extending therethrough, with said bore providing a longitudinal slot in each said mounting member to permit extension of a bit edge perpendicular to said cuttting edge into said bore,
   (f) and an annular bushing disposed in said bore and fixed against axial movement therein,
   (g) said bushing having an outer end portion with a conically tapered bearing surface engaged by the extended bit edges of (e),
   (h) and said bushing being replaceable with bushings having conically tapered bearing surfaces of differing desired diameters to provide for radial adjustment of said bits.

8. The tool of claim 7 in which: each edge of each said tool bit is a cuttting edge so that the bit may be indexed in position to present different edges to the work.

9. A cutting tool comprising:
(a) a tool body having an inner end adapted to be rotatably driven and an outer cutting end,
(b) a plurality of circumferentially spaced tool bit mounting members disposed at the said outer cutting end of said body, each mounting member having a stepped construction providing a ledge and an indented surface extending longitudinally outwardly below the ledge,
(c) a radially extending tool bit disposed on each said indented surface and being disposable in a plurality of radial positions,
(d) a clamp having its inner end portion disposed on each said ledge and extending over each said tool bit and having a wedge shaped on its outer end providing a straight line clamping edge closely adjacent the bit,
(e) screw means extending through the central portion of each said clamp and into said mounting member for holding the clamp in place,
(f) set screw means extending through each said mounting member and engaging the said clamp at its inner end portion to thereby pivot the clamp about the screw of (e) to cause said straight line clamping edge to tightly engage said bit,
(g) said tool body having an axial bore extending therethrough, with said bore having a plurality of longitudinal slots disposed to permit extension of the inner longitudinal edges of said tool bits into said bore,
(h) and an annular bushing disposed in said bore and fixed against axial movement therein,
(i) said bushing having an outer end portion disposed adjacent said slots and providing a bearing surface engaged by the said longitudinal edges of said tool bits, and being replaceable with bushings having outer end portions of differing desired diameter to provide for radial adjustment of said bits.

10. In a cutting tool:
(a) a tool body having an inner end adapted to be rotatably driven and an outer cutting end,
(b) a plurality of circumferentially spaced tool bit mounting members disposed at the said outer cutting end of said body, each mounting member having a stepped construction providing a ledge and an indented surface extending longitudinally outwardly below the ledge,
(c) a radially extending tool bit disposed on each said indented surface and being disposable in a plurality of radial positions,
(d) a clamp having its inner end portion disposed on each said ledge and extending over each said tool bit and having a wedge shape on its outer end providing a straight line clamping edge closely adjacent the bit,
(e) screw means extending through the central portion of each said clamp and into said mounting member for holding the clamp in place,
(f) and set screw means extending through each said mounting member and engaging the said clamp at its inner end portion to thererby pivot the clamp about the screw of (e) to cause said straight line clamping edge to tightly engage said bit.

No references cited.

WILLIAM W. DYER, Jr., *Primary Examiner.*